United States Patent
Huang et al.

(10) Patent No.: US 11,614,837 B2
(45) Date of Patent: Mar. 28, 2023

(54) DEVICE AND METHOD FOR GENERATING FLOATING IMAGE

(71) Applicant: Industrial Technology Research Institute, Hsinchu (TW)

(72) Inventors: Yi-Hsiang Huang, Changhua County (TW); Ping-Chang Jui, Taipei (TW); Hung Tsou, Hsinchu County (TW); Szu-Wei Wu, Taoyuan (TW); Han-Sung Chan, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/235,940

(22) Filed: Apr. 21, 2021

(65) Prior Publication Data

US 2021/0342031 A1 Nov. 4, 2021

Related U.S. Application Data

(60) Provisional application No. 63/017,670, filed on Apr. 30, 2020.

(51) Int. Cl.
*G06F 3/042* (2006.01)
*G02B 30/56* (2020.01)
*G06F 3/043* (2006.01)

(52) U.S. Cl.
CPC ........... *G06F 3/0428* (2013.01); *G02B 30/56* (2020.01); *G06F 3/043* (2013.01)

(58) Field of Classification Search
CPC ........ G02B 30/00; G02B 30/50; G02B 30/56; G06F 3/042; G06F 3/0428; G06F 3/043
See application file for complete search history.

(56) References Cited

U.S. PATENT DOCUMENTS

| 6,922,267 B2 | 7/2005 | Endo et al. |
| 9,606,506 B2 | 3/2017 | Large et al. |

(Continued)

FOREIGN PATENT DOCUMENTS

| CN | 104679238 | 6/2015 |
| TW | I413803 | 11/2013 |

(Continued)

OTHER PUBLICATIONS

"Office Action of Taiwan Counterpart Application", dated Mar. 28, 2022, p. 1-p. 11.

*Primary Examiner* — Xuemei Zheng
(74) *Attorney, Agent, or Firm* — JCIPRNET

(57) ABSTRACT

A device and a method for generating floating images are provided. An optical imaging module generates a first floating image. A sensing module sends a detection signal to sense first position information of a tested object at a first time point, and generates a feedback signal according to the first position information when the first position information is within a contour range of the first floating image. A signal processing module is electrically connected to the optical imaging module and the sensing module to receive the feedback signal and generate at least one control command and/or at least one feedback command corresponding to the feedback signal. The at least one control command is transmitted to a controller to perform corresponding control on the controller, and the at least one feedback command is transmitted to the optical imaging module, so that the optical imaging module generates a second floating image different from the first floating image.

15 Claims, 12 Drawing Sheets

(56) References Cited

U.S. PATENT DOCUMENTS

| | | |
|---|---|---|
| 9,766,806 B2 | 9/2017 | Bennet et al. |
| 10,108,143 B2 | 10/2018 | Rhee et al. |
| 2010/0007636 A1 | 1/2010 | Tomisawa et al. |
| 2010/0245345 A1* | 9/2010 | Tomisawa ............ H04N 13/393 345/419 |
| 2015/0370415 A1 | 12/2015 | Takahashi et al. |
| 2016/0364836 A1* | 12/2016 | Sumi ...................... G02B 30/56 |
| 2017/0219838 A1* | 8/2017 | Yang ...................... G02B 30/36 |
| 2019/0179160 A1* | 6/2019 | Ito .......................... G02B 30/56 |
| 2021/0263612 A1* | 8/2021 | Shinohara ............. G06F 3/0488 |

FOREIGN PATENT DOCUMENTS

| | | |
|---|---|---|
| TW | I654448 | 3/2019 |
| WO | 2020012711 | 1/2020 |

\* cited by examiner

DEVICE AND METHOD FOR GENERATING FLOATING IMAGE

CROSS REFERENCE TO RELATED APPLICATION

This application claims the priority benefit of U.S. provisional application Ser. No. 63/017,670, filed on Apr. 30, 2020. The entirety of the above-mentioned patent application is hereby incorporated by reference herein and made a part of specification.

BACKGROUND

Technical Field

The disclosure relates to a device and a method for generating floating images.

Description of Related Art

A human machine interface (HMI) is a medium for a user to interact with a device. The HMI may be classified into a contact interface and a non-contact interface according to an interaction mode. When a contact interface is used, the user directly touches a surface of the device to interact with the device. When a non-contact interface is used, the user may interact with the device without directly touching the surface of the device.

The application of the contact interface is quite extensive. After the contact interface is used by the user, it is required to clean the surface from time to time to keep the surface clean, so as to prevent some diseases from contaminating the surface of the contact interface due to the user's contact, which may probably infect other users who touch the contact interface afterwards.

In contrast, when a non-contact interface is used, there is no need to directly touch the surface of the device, which may prevent body fluids from remaining on the surface of the device, thereby reducing the infection resulting from indirect contact. However, the non-contact interface tends to be unintuitive in use and lack effective prompts, which leads to problems such as a poor control experience to the user.

SUMMARY

The disclosure is directed to a device and a method for generating floating images, which are adapted to generate images with a real spatial stereoscopic sense, and generate a corresponding optical image according to a position of a tested object.

An embodiment of the disclosure provides a device for generating floating images. An optical imaging module is used to generate a first floating image. A sensing module sends a detection signal to sense first position information of a tested object at a first time point, and generates a feedback signal according to the first position information when the first position information is within a contour range of the first floating image. A signal processing module is electrically connected to the optical imaging module and the sensing module to receive the feedback signal and generate at least one control command and/or at least one feedback command corresponding to the feedback signal. The at least one control command is transmitted to a controller to perform corresponding control on the controller, and the at least one feedback command is transmitted to the optical imaging module, so that the optical imaging module generates a second floating image that is different from the first floating image.

Another embodiment of the disclosure provides a method for generating floating images, which includes: generating a first floating image; sending a detection signal to sense first position information of a tested object at a first time point, and generating a feedback signal according to the first position information when the first position information is within a contour range of the first floating image; and receiving the feedback signal and generating at least one control command and/or at least one feedback command corresponding to the feedback signal, wherein corresponding control is performed according to the at least one control command, and a second floating image that is different from the first floating image is generated according to the at least one feedback command.

The device and the method for generating floating images according to the embodiments of the disclosure may restore a spatial three-dimensional image, and generate a corresponding optical image according to the position of the tested object. By retaining existing usage habits through intuitive operations, it may help replacing conventional contact or non-contact interfaces.

DESCRIPTION OF THE EMBODIMENTS

Figure 1:
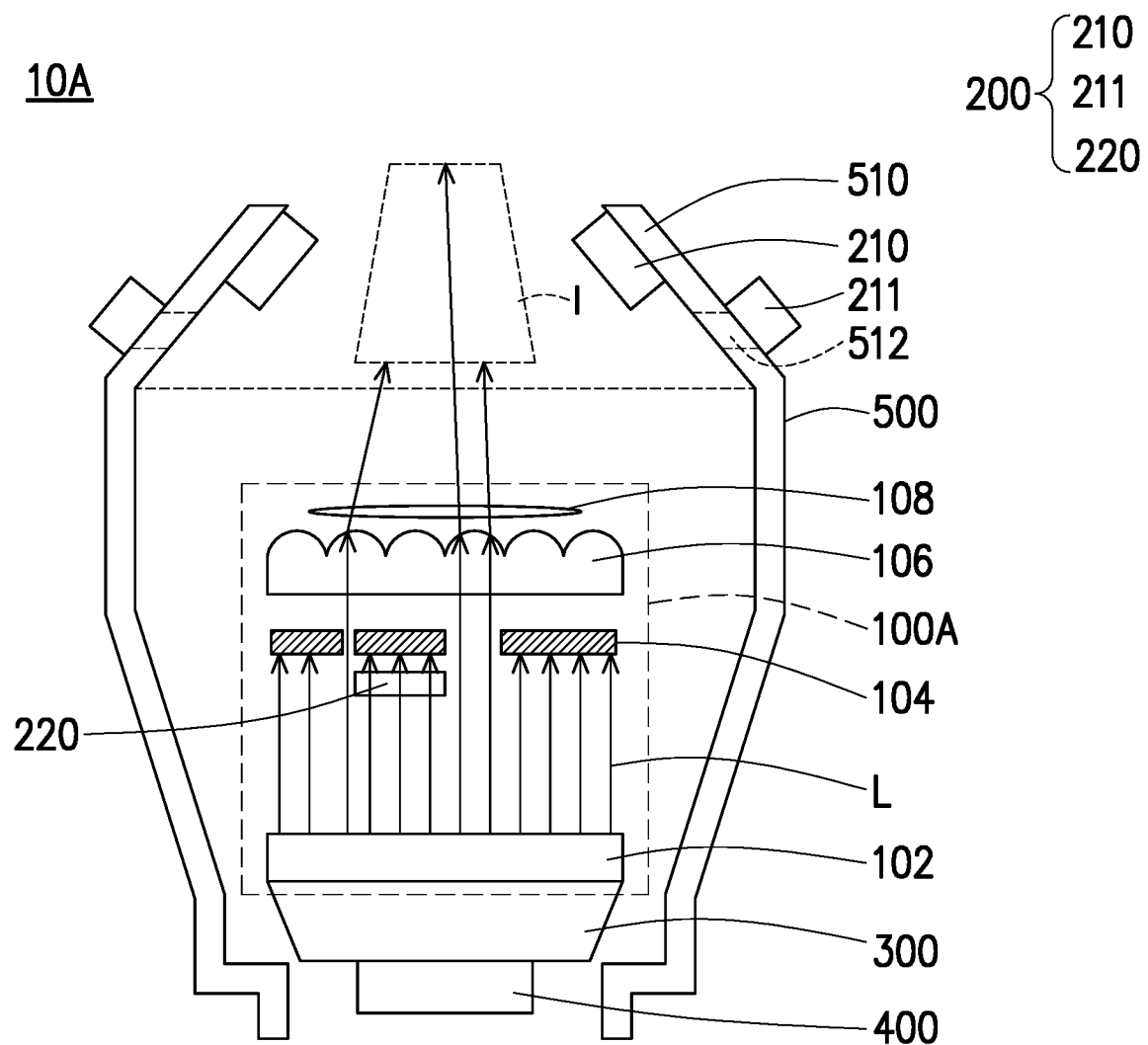
FIG. 1 is a schematic diagram of a device for generating floating images according to an embodiment of the disclosure.

Following embodiments are provided in collaboration with the accompanying drawings for detailed description, but the provided embodiments are not used to limit a scope of the disclosure. In addition, component sizes in the drawings are drawn for convenience of explanation, and do not represent the actual component sizes. Moreover, although "first", "second", etc. are used in the text to describe different components and/or film layers, these components and/or film layers should not be limited to these terms. Rather, these terms are only used to distinguish one component or film layer from another component or film layer. Therefore, a first component or film layer discussed below may be referred to as a second element or film layer without departing from the teachings of the embodiments. To facilitate understanding, similar components are described with the same symbols in the following description.

In the description of the embodiments of the disclosure, different examples may use repeated reference symbols and/or words. These repeated symbols or words are for the purpose of simplification and clarity, and are not used to limit a relationship between the various embodiments and/or the appearance structure. Furthermore, if the following disclosure of the specification describes that a first feature is formed on or above a second feature, it means that it includes an embodiment in which the formed first feature and the second feature are in direct contact, and also includes an embodiment in which an additional feature is formed between the first feature and the second feature, so that the first feature and the second feature may not be in direct contact. To facilitate understanding, similar components are described with the same symbols in the following description.

When a light source illuminates an object, an observer observes reflected light reflected by the object, and accordingly observes the object. In other words, the observer views the object in space through the reflected light reflected from the surface of the object. The reflected light observed by the observer has characteristics of positions, angles, etc., and these characteristics may be described by a plenoptic function $P(x, y, z, \theta, \varphi, \lambda, t)$, where x, y, z are three-dimensional (3D) coordinates of the observer relative to the object; $\theta$ and $\varphi$ respectively represent a polar angle $\theta$ and an azimuth angle $\varphi$ of the observer relative to the object in spherical coordinates; $\lambda$ represents a wavelength of the reflected light; and t represents a time when the reflected light is received.

Through a combination of a light field imaging film and a lens, characteristics and a direction of the reflected light entering the observer's eyes are simulated and restored through an algorithm, and an optical method may be used to reconstruct the plenoptic function $P(x, y, z, \theta, \varphi, \lambda, t)$, i.e., a direction and intensity of the light is reconstructed, thereby reconstructing a 3D image of a virtual object in the real space, so that a same visual effect as observing the real object is produced when the observer observes the reconstructed virtual image from various angles.

FIG. 1 is an embodiment of a device for generating floating images. A floating image device 10A may include an optical imaging module 100A, a sensing module 200, a signal processing module 300, a power supply module 400, and a housing 500.

The optical imaging module 100A is used to generate a floating image I. The optical imaging module 100A includes a light source 102, a light filter 104 and an optical modulator 106. The light source 102 is electrically connected to the signal processing module 300. The light L generated by the light source 102 sequentially passes through the light filter 104 and the optical modulator 106. When the light L generated by the light source 102 passes through the light filter 104 and the optical modulator 106, a light intensity and transmission direction of the reflected light entering the user's eyes may be restored by reconstructing a plenoptic function of an original object, thereby reconstructing a 3D image of the virtual object in the real space, so that a same visual effect as observing the real object is produced when the observer observes the reconstructed virtual image from various angles.

The light source 102 is used to generate the light L. According to some embodiments, the light L generated by the light source 102 is parallel light. According to some embodiments, if the light L generated by the light source 102 is non-parallel light, a lens may be arranged in front of a light-emitting surface of the light source 102, for example, a Fresnel lens (not shown) is arranged in front of the light-emitting surface of the light source 102 to make the light L to become parallel light. According to some embodiments, the light L generated by the light source 102 may be monochromatic light, multiple monochromatic light, or white light. According to some embodiments, the light source 102 may be a light-emitting diode (LED), a quantum dot (quantum dot), an organic light-emitting diode (OLED) or other similar light sources, but the disclosure is not limited thereto.

As shown in FIG. 1, the light L generated by the light source 102 passes through the light filter 104. The light filter 104 is used to receive the light L, and perform patterning and optical field pattern optimization on the light L to form a light field image. According to some embodiments, the light filter 104 may be a high-resolution integrated imaging film. A computer may calculate a plenoptic function P of the object through an algorithm, and then record image information on the imaging film, where the image information includes the direction and angle of the light that forms the floating image I, so that the incident light L may reconstruct a 3D optical image of the original object. The imaging film may record the image information of an object, and each imaging film may generate a floating image. According to some embodiments, a method of writing the image information on the imaging film may be a photolithography process or a screen printing process, or other similar methods. According to some embodiments, a material of the imaging film may be glass, plastic or other transparent materials.

According to some embodiments, the light filter 104 may also produce the effect of optical field pattern optimization. According to some embodiments, the incident light L may be non-parallel light. If the incident light L is non-parallel light, when the incident light L enters the light filter 104, the incident light L may be reflected to an unexpected region, resulting in unexpected image changes. According to some embodiments, when designing an imaging film serving as the light filter 104, a structure or pattern of the light filter 104 may be adjusted through an algorithm, for example, to change a thickness of some regions of the light filter 104 (for example, to increase the thickness of some regions, such that after the incident light L enters the light filter 104, a part of the incident light at a large angle cannot pass through the light filter 104, and relatively parallel light may pass through the light filter 104). As described above, the light filter 104 may achieve the effect of optical field pattern optimization to optimize the imaging quality.

As shown in FIG. 1, the light L passes through the optical modulator 106 after passing through the light filter 104. The optical modulator 106 is used to receive the light L passing through the light filter 104 and focus the light L passing through the light filter 104 to generate the floating image I. As shown in FIG. 1, a part of the floating image I is located inside the housing 500, and a part of the floating image I floats out of the housing 500. According to some embodiments, by adjusting a position of the optical modulator 106, the floating image I may be all located inside the housing 500 (not shown) or outside the housing 500 (not shown). According to some embodiments, the optical modulator 106 may be a microlens array, a cylindrical lens, an optical fiber, an optical grating, or a photonic crystal, but the disclosure is not limited thereto. In some embodiments, the optical modulator 106 may be a microlens array, which avails presenting the floating image, and the image may be viewed in all directions or in 360 degrees. In some other embodiments, the optical modulator 106 may be a cylindrical lens. When the optical modulator 106 is a cylindrical lens, in a main observation direction (for example, a direction perpendicular to an optical axis of the cylindrical lens), the floating image may have a three-dimensional change, while in a non-main observation direction (for example, a direction parallel to the optical axis of the cylindrical lens), the floating image does not have a three-dimensional change.

According to some embodiments, a lens 108 may be further disposed between the optical modulator 106 and the floating image I, and the lens 108 may be a single lens or a lens group. The lens 108 may have a focusing effect, so that the light L is more concentrated, and the floating image I becomes clearer or a viewing angle thereof is increased.

As shown in FIG. 1, after the light L is generated by the light source 102, the light L passes through the light filter 104 and then passes through the optical modulator 106, and is focused on a specific position to generate the floating image I. The light L passes through the light filter 104 and the optical modulator 106 before forming the floating image I, so that the floating image I may have a higher resolution.

As shown in FIG. 1, the floating image device 10A has the sensing module 200 for sensing position information of a tested object at a time point, and generating a feedback signal according to the position information when the position information is within a contour range of the floating image I.

As shown in FIG. 1, the sensing module 200 may include a sensing module 210, a sensing module 211 and/or a sensing module 220. The sensing module 210 is located at a hollow frustum 510 of the housing 500 of the floating image device 10A. The hollow frustum 510 covers above a part of the light-emitting surface of the optical modulator 106 of the optical imaging module 100A, and surrounds the floating image I. As shown in FIG. 1, a part of the floating image I is located inside the hollow frustum 510, and part of the floating image I floats out of the hollow frustum 510. The sensing module 211 is located outside the hollow frustum 510 of the housing 500 of the floating image device 10A. The hollow frustum 510 may have an opening 512, and the sensing module 211 covers the opening 512. The opening 512 may be used as a signal transmission region, so that the sensing module 211 may sense the floating image I through the opening 512 to implement object detection. In addition, the sensing module 220 may be disposed on a light incident surface of the light filter 104 and located between the light source 102 and the light filter 104. The sensing module 220 is located in a signal transmission region of the light filter 104 to implement object detection.

As shown in FIG. 1, the sensing module 200 may define a contour range of the floating image I, and send a signal to sense the position information of the tested object entering the contour range of the floating image I. According to some embodiments, the detection signal sent by the sensing module 200 is an invisible light signal, an ultrasonic signal, or other signals that do not interfere with the light L.

As shown in FIG. 1, the floating image device 10A has the signal processing module 300. The signal processing module 300 may be located on a back side of the light source 102 of the optical imaging module 100A, but it may also be located at other suitable positions, which is not limited by the disclosure. The signal processing module 300 is electrically connected to the sensing module 200 (including the sensing module 210, the sensing module 211, and/or the sensing module 220). The signal processing module 300 is electrically connected to the optical imaging module 100A. According to some embodiments, the signal processing module 300 receives the feedback signal sent by the sensing module 200, and generates at least one corresponding control command and/or at least one feedback command according to the feedback signal. The at least one control command is transmitted to a controller (not shown) to perform corresponding control on the controller. The feedback command may be sent back to the optical imaging module 100A so that the optical imaging module 100A generates a new floating image. According to some embodiments, the signal processing module 300 may be a central processing unit, but the disclosure is not limited thereto.

As shown in FIG. 1, the floating image device 10A may have the power supply module 400. The power supply module 400 is electrically connected to the optical imaging module 100A, the sensing module 200 and the signal processing module 300, and is used to provide power required by the optical imaging module 100A, the sensing module 200 and the signal processing module 300 in the floating image device 10A.

As shown in FIG. 1, according to some embodiments, the floating image device 10A may have the housing 500. As shown in FIG. 1, the optical imaging module 100A, the sensing module 200, the signal processing module 300, and the power supply module 400 may be located in the housing 500. The housing 500 includes the hollow frustum 510. The hollow frustum 510 is located on the light-emitting surface of the optical imaging module 100A. According to some embodiments, an inner side of the housing 500, including an inner side of the hollow frustum 510 has a black or dark color, which may prevent the light L generated by the optical imaging module 100A from being reflected in the housing 500 to cause glare. According to some embodiments, the floating image device 10A may not include the housing 500. According to some embodiments, the floating image device 10A may not include the hollow frustum 510 and use the sensing module 220.

FIG. 2A to FIG. 2F illustrate a method of controlling a floating image device according to an embodiment of the disclosure. To simplify the drawing, some elements of the floating image device 10A are not shown.

Figure 2A:
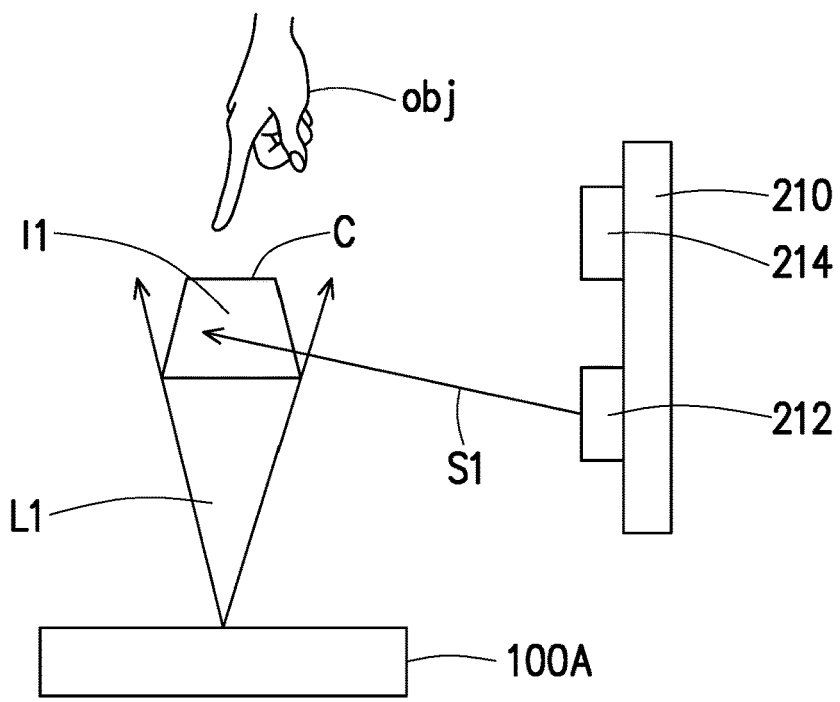
FIG. 2A to FIG. 2F illustrate a method of controlling a floating image device according to an embodiment of the disclosure.

Referring to FIG. 2A, the floating image device includes the optical imaging module 100A and the sensing module 210. The sensing module 210 includes a transmitter 212 and a receiver 214. According to some embodiments, the transmitter 212 and the receiver 214 may be the same type of elements. In FIG. 2A, the number of the sensing module 210 is one, and the number of the transmitter 212 and the number of the receiver 214 are also one, but the disclosure is not limited thereto, and the number of the transmitter 212 may not be equal to the number of the receiver 214.

Referring to FIG. 2A, the optical imaging module 100A emits a first light beam L1 to form a first floating image I1. The sensing module 210 defines a contour C of the first floating image I1 as a detection boundary. The transmitter 212 of the sensing module 210 emits a detection signal S1. A tested object obj is located outside the contour C of the first floating image I1. According to some embodiments, the tested object obj may be a finger. Since the tested object obj is located outside the contour C of the first floating image I1, the detection signal S1 is not reflected into the receiver 214 of the sensing module 210 by the tested object obj.

Figure 2B:
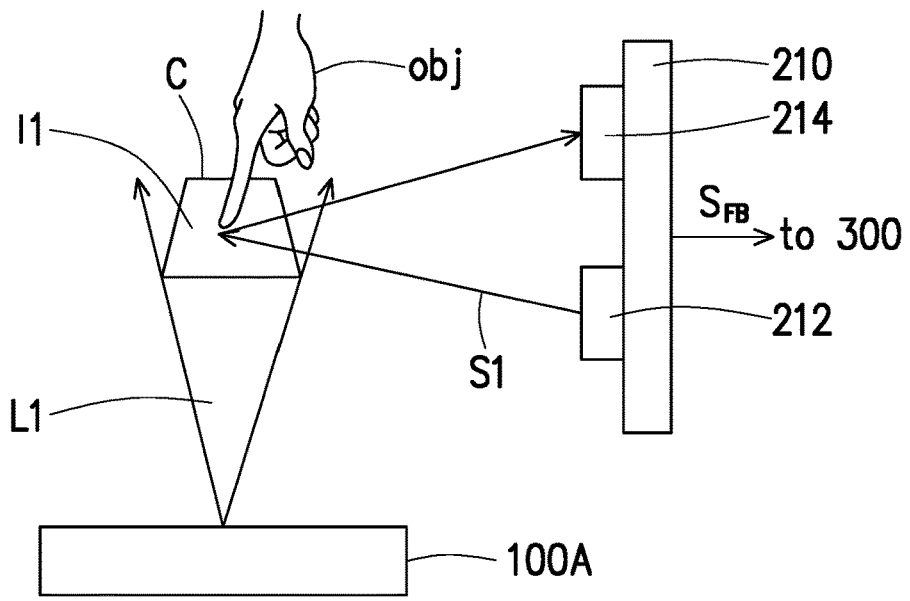

Referring to FIG. 2B, the tested object obj is located within the contour C of the first floating image I1. At this moment, the detection signal S1 emitted by the transmitter 212 of the sensing module 210 is reflected by the tested object obj to enter the receiver 214 of the sensing module 210. After receiving the detection signal S1 reflected by the tested object obj, the sensing module 210 generates a feedback signal $S_{FB}$, and transmits the feedback signal $S_{FB}$ to the signal processing module 300 (not shown).

Figure 2C:
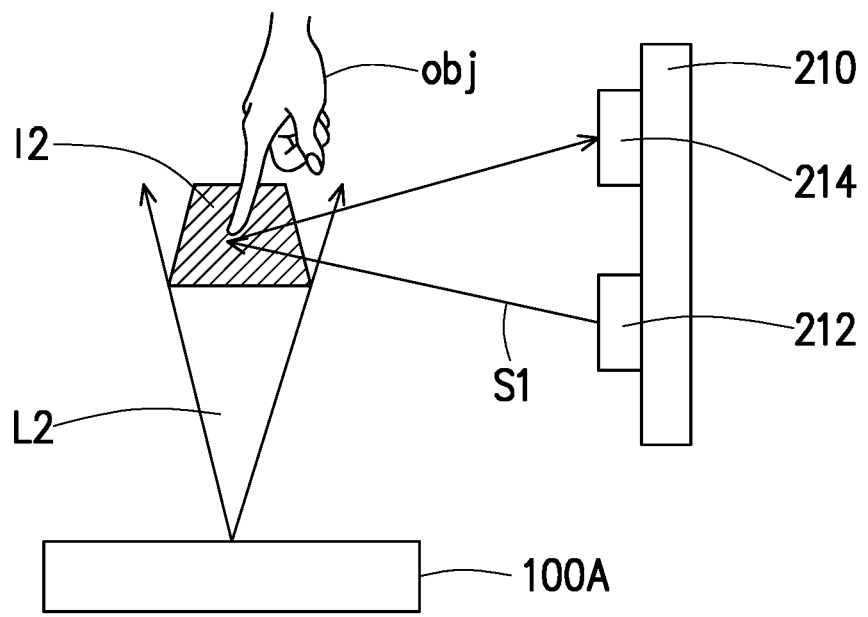
Figure 2D:
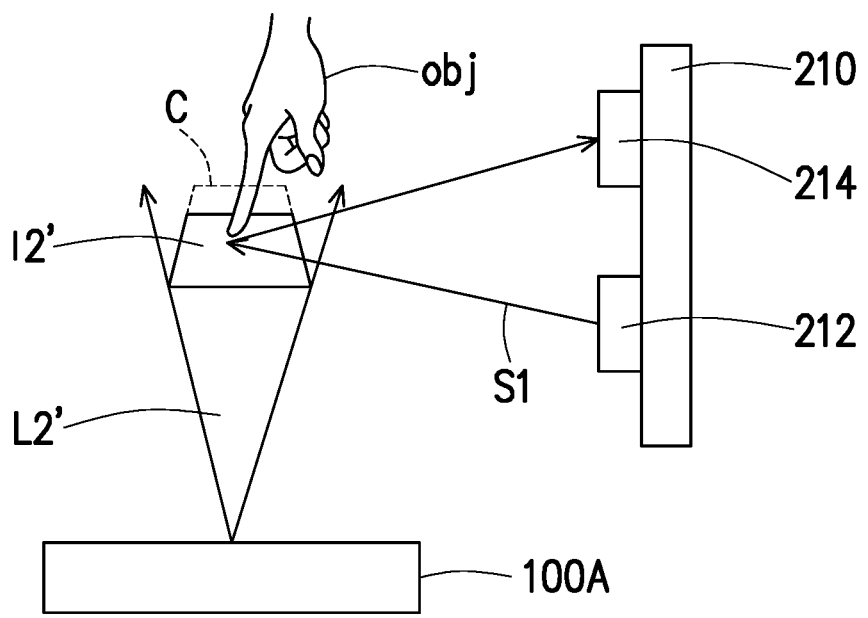

Referring to FIG. 2C and FIG. 2D, after the signal processing module 300 receives the feedback signal $S_{FB}$ sent by the sensing module 210, it controls the optical imaging module 100A to generate a second light beam L2 to produce a second floating image I2 that is different from the first floating image I1. As shown in FIG. 2C, according to some embodiments, the second floating image I2 and the first floating image I1 may have a same pattern. According to some embodiments, the second floating image I2 and the first floating image I1 may have different colors. For example, the first floating image I1 may have a first color, and the second floating image I2 may have a second color different from the first color. According to some embodiments, the second floating image I2 and the first floating image I1 may have different brightness. For example, the first floating image I1 may have a first brightness, and the second floating image I2 may have a second brightness different from the first brightness.

As shown in FIG. 2D, according to some embodiments, by changing the light filter 104, a second floating image I2' having a pattern, color or brightness different from that of the first floating image I1 may be generated. According to some embodiments, the second floating image I2' and the first floating image I1 may have different patterns, where the first floating image I1 may be a first pattern, and the second floating image I2' may be a second pattern different from the first pattern. According to some embodiments, the second floating image I2' and the first floating image I1 may have different colors. For example, the first floating image I1 may have a first color, and the second floating image I2' may have a second color different from the first color. According to some embodiments, the second floating image I2' and the first floating image I1 may have different brightness. For example, the first floating image I1 may have a first brightness, and the second floating image I2' may have a second brightness different from the first brightness.

Figure 2E:
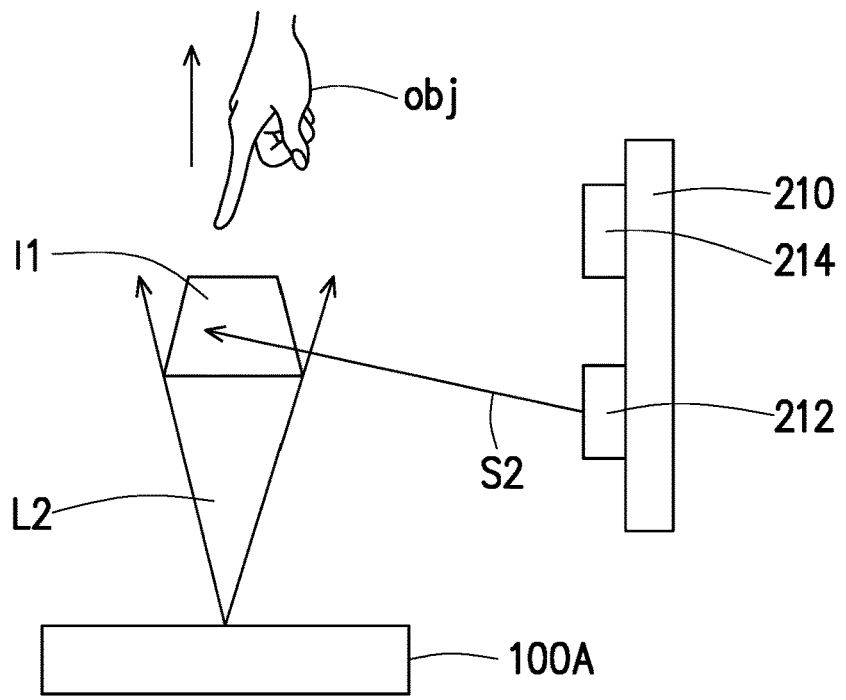

According to some embodiments, after FIG. 2C, reference may be made to FIG. 2E. At a second time point after the first time point, the transmitter 212 of the sensing module 210 emits a second detection signal S2. Since the tested object obj is located outside the contour C of the first floating image I1, the sensing module 210 does not receive the second detection signal S2 reflected by the tested object obj, and the sensing module 210 may stop generating the feedback signal $S_{FB}$.

Figure 2F:
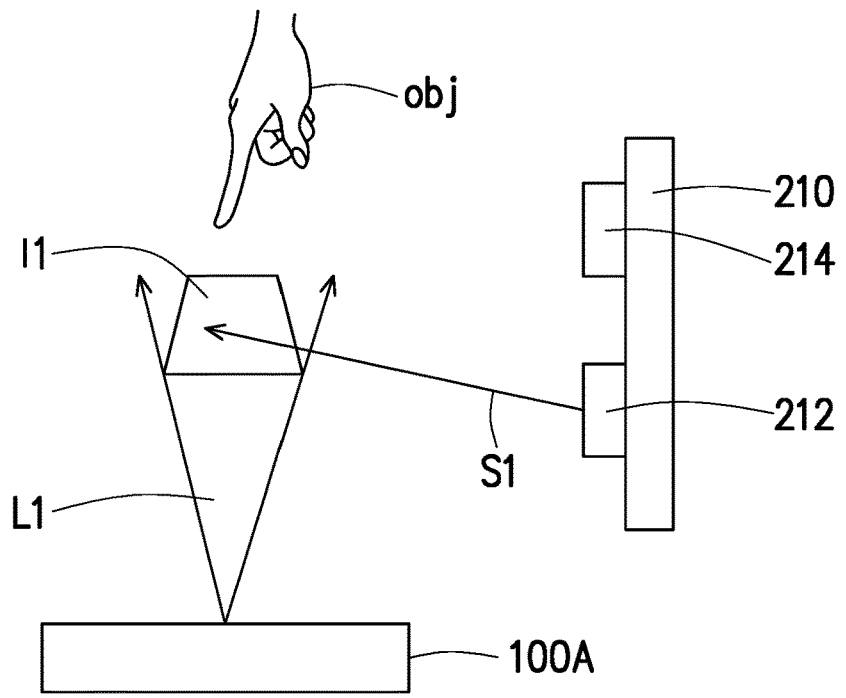

Referring to FIG. 2F, the sensing module 210 stops generating the feedback signal $S_{FB}$, and the signal processing module 300 stops generating the at least one control command and/or the at least one feedback command corresponding to the feedback signal $S_{FB}$, and stops transmitting the at least one control command to the controller to stop performing corresponding control on the controller and/or stop the optical imaging module 100A from generating the second light beam L2 and the second floating image I2, and causes the optical imaging module 100A to resume generating the first light beam L1 and the first floating image I1.

According to FIG. 2A to FIG. 2F, the floating image device 10A may correspondingly generate the first floating image I1 and the second floating images I2, I2' according to positions of the tested object obj, and switch between the first floating image I1 and the second floating images I2, I2' to perform interactive operations between the tested object and the floating images.

Figure 3:
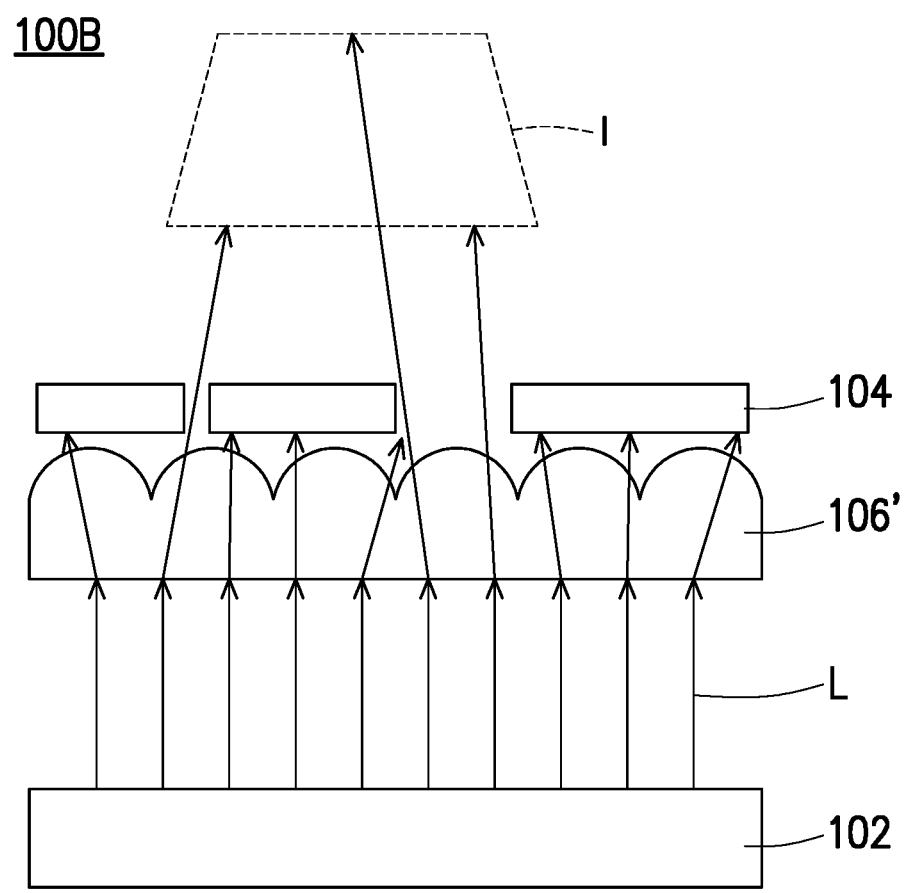
FIG. 3 is a schematic diagram of an optical imaging module according to an embodiment of the disclosure.

FIG. 3 is a schematic diagram of an optical imaging module 100B according to an embodiment of the disclosure. The optical imaging module 100B includes the light source 102, the light filter 104, and an optical modulator 106'. After the light L is generated by the light source 102, it passes through the optical modulator 106' to focus on a specific position, and then passes through the light filter 104 to form a floating image I.

The optical imaging module 100B and the optical imaging module 100A shown in FIG. 1 have a similar component combination. In the optical imaging module 100B, the light L generated by the light source 102 sequentially passes through the optical modulator 106' and the light filter 104. The light L generated by the light source 102 is first focused on a specific position by the optical modulator 106', and then patterned by the light filter 104, so that the light generates the floating image I at the specific position.

According to some embodiments, the optical modulator 106' of the optical imaging module 100B may be a microlens array, an optical lens, an optical fiber, an optical grating, or a photonic crystal, but the disclosure is not limited thereto.

As shown in FIG. 3, after the light L is generated by the light source 102, it passes through the optical modulator 106' to focus on a specific position, and then passes through the light filter 104 to form the floating image I, which avails obtaining the floating image I with a large viewing angle.

Figure 4:
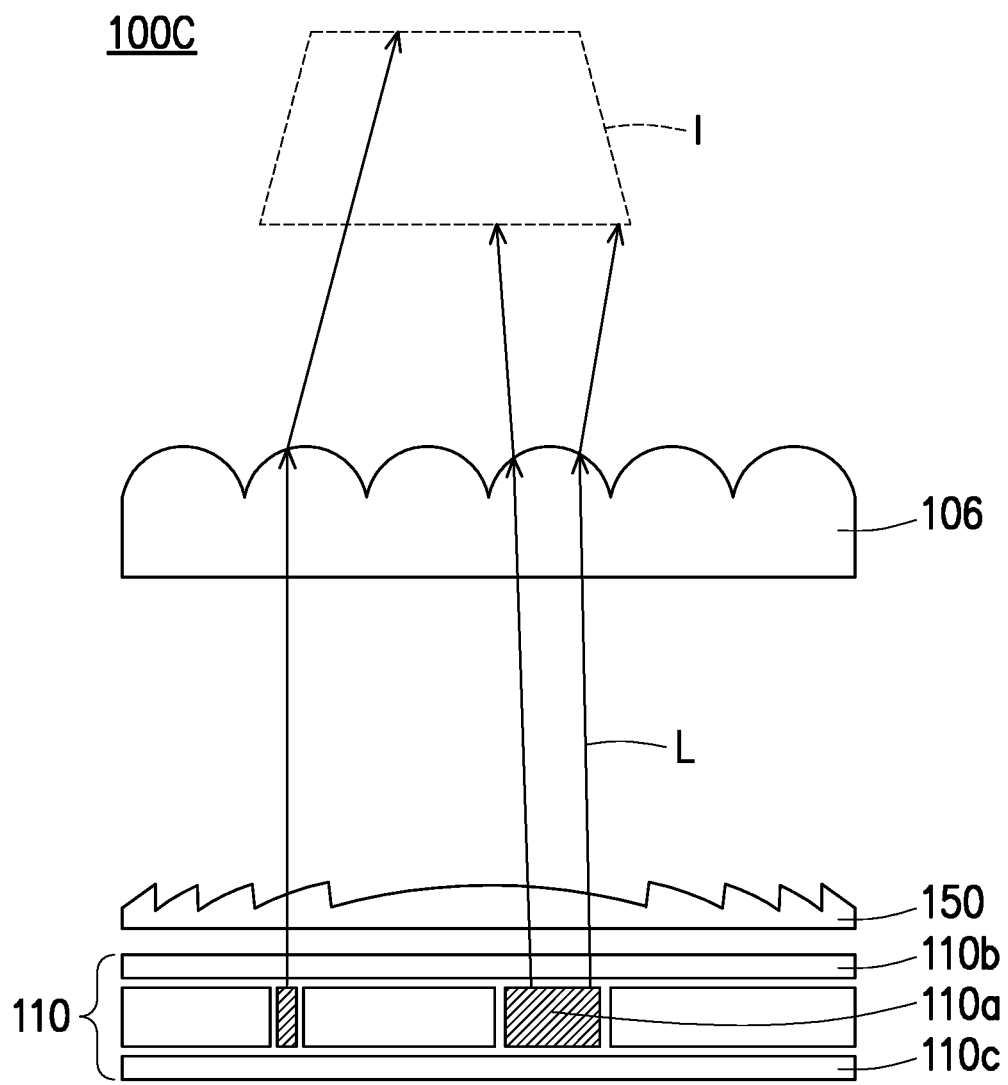
FIG. 4 is a schematic diagram of an optical imaging module according to an embodiment of the disclosure.

FIG. 4 is a schematic diagram of an optical imaging module 100C according to an embodiment of the disclosure. The optical imaging module 100C includes a light-emitting module 110, a collimating lens 150 and the optical modulator 106. The light-emitting module 110 is electrically connected to the signal processing module 300 to generate patterned light L. After the patterned light L is generated by the light-emitting module 110, it passes through the collimating lens 150 and then passes through the optical modulator 106 to form the floating image I. The light-emitting module 110 of the optical imaging module 100C may be regarded as integrating the light source 102 and the light filter 104 of the optical imaging module 100A.

As shown in FIG. 4, the light-emitting module 110 includes a light-emitting layer 110a, a first electrode 110b and a second electrode 110c. The first electrode 110b and the second electrode 110c are respectively located on two sides of the light-emitting layer 110a, where the first electrode 110b is located on a light-emitting surface of the light-emitting layer 110a, and the second electrode 110c is located on the other surface of the light-emitting layer 110a opposite to the light-emitting surface. The light-emitting layer 110a is a single-color or multi-color layered light-emitting monomer. The lighting state of the light-emitting layer 110a is controlled through the first electrode 110b and the second electrode 110c to generate the patterned light L.

The light L emitted by the light-emitting layer 110a of the light-emitting module 110 is not necessarily parallel light. According to some embodiments, the light L emitted by the light-emitting module 110 may first pass through the collimating lens 150 to become parallel light before passing through the optical modulator 106, so as to achieve an effect of optical field pattern optimization to optimize the imaging quality. According to some embodiments, the collimating lens 150 may be a Fresnel lens.

According to some embodiments, if a distance between the light-emitting module 110 and the optical modulator 106 is equal to a focal length of the optical modulator 106, the collimating lens 150 may be omitted, which avails further reducing a size of the optical imaging module. At this time, the light L emitted by the light-emitting module 110 directly passes through the optical modulator 106 to focus on a specific position and generate the floating image I.

According to some embodiments, the light L emitted from the light-emitting layer 110a may be controlled through the first electrode 110b and the second electrode 110c of the light-emitting module 110, so as to respectively generate a first floating image and a second floating image difference from the first floating image. According to some embodiments, the first electrode 110b and the second electrode 110c may control the light-emitting layer 110a to emit a first light with a first color to form a first floating image, and emit a second light with a color different from the first color to form a second floating image. According to some embodiments, the first electrode 110b and the second electrode 110c may control the light-emitting layer 110a to emit the first light with a first brightness to form the first floating image, and emit the second light with a brightness different from the first brightness to form the second floating image.

As shown in FIG. 4, the light L emitted by the light-emitting module 110 may pass through the collimating lens 150 and then pass through the optical modulator 106 to focus on the specific position and generate the floating image I. The light-emitting layer 110a of the light-emitting module 110 may be controlled by the first electrode 110b and the second electrode 110c to emit specific light, which is equivalent to having the functions of a light source and a light filter, and may actively generate imaging light. According to some embodiments, the light-emitting layer 110a may be a single-color or multi-color layered light-emitting monomer, and conduction positions of the first electrode 110b and the second electrode 110c are designed to control a lighting state of the light-emitting layer 110a to generate the imaging light L of the floating image I to be imaged. According to other embodiments, the light-emitting layer 110a may be a single-color or multi-color layered light-emitting monomer with different sizes of light-emitting regions, and the first electrode 110b and the second electrode 110c may be designed to control lighting states of the different sizes of the light-emitting regions of the light-emitting layer 110a, so as to generate the imaging light L of the floating image I to be imaged.

According to some embodiments, the light-emitting layer 110a may be a light-emitting diode, a quantum dot, an organic light-emitting diode, or other similar light-emitting devices, but the disclosure is not limited thereto. According to some embodiments, the first electrode 110b may be a transparent electrode to reduce the loss of the light L passing through the first electrode. According to some embodiments, the first electrode 110b is a cathode and the second electrode 110c is an anode. According to some embodiments, in addition to metal oxide or alkali metal salt doped with metal, the material of the first electrode 110b may also be further doped with an organic material to improve transparency. For example, the metal oxide includes but is not limited to $LiO_2$ (lithium superoxide) or $MoO_3$ (molybdenum trioxide); the alkali metal salt includes, but is not limited to, LiF (lithium fluoride), $LiBO_3$ (lithium borate), $K_2SiO_3$ (potassium silicate)), $Cs_2CO_3$ (cesium carbonate), $CH_3COOM$ (metal acetates) (M is Li (lithium), Na (sodium), K (potassium), Rb (rubidium) or Cs (cesium)); and metal may be listed but is not limited to Al (aluminum), Ca (calcium), Ag (silver), Cu (copper), Mg (magnesium) or alloys thereof, such as Mg:Ag, Li:Al, etc. According to some embodiments, a material of the second electrode 110c may include metal oxides, such as indium tin oxide (ITO), indium zinc oxide (IZO), aluminum-doped zinc oxide, AZO), zinc oxide (ZnO), or gallium-doped zinc oxide (GZO), but the disclosure is not limited thereto.

Figure 5A:
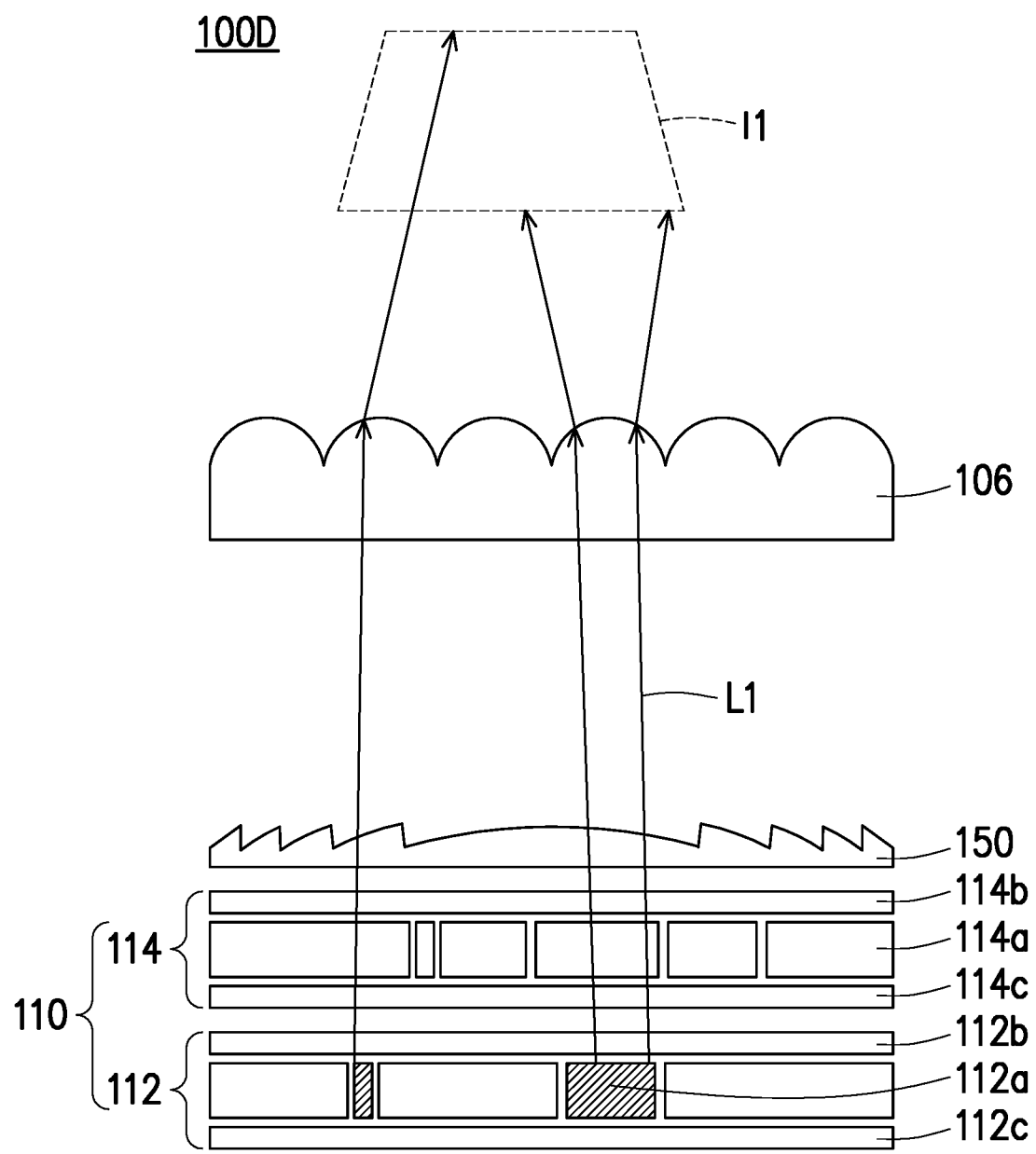
FIG. 5A and FIG. 5B are schematic diagrams of an optical imaging module according to an embodiment of the disclosure.
Figure 5B:
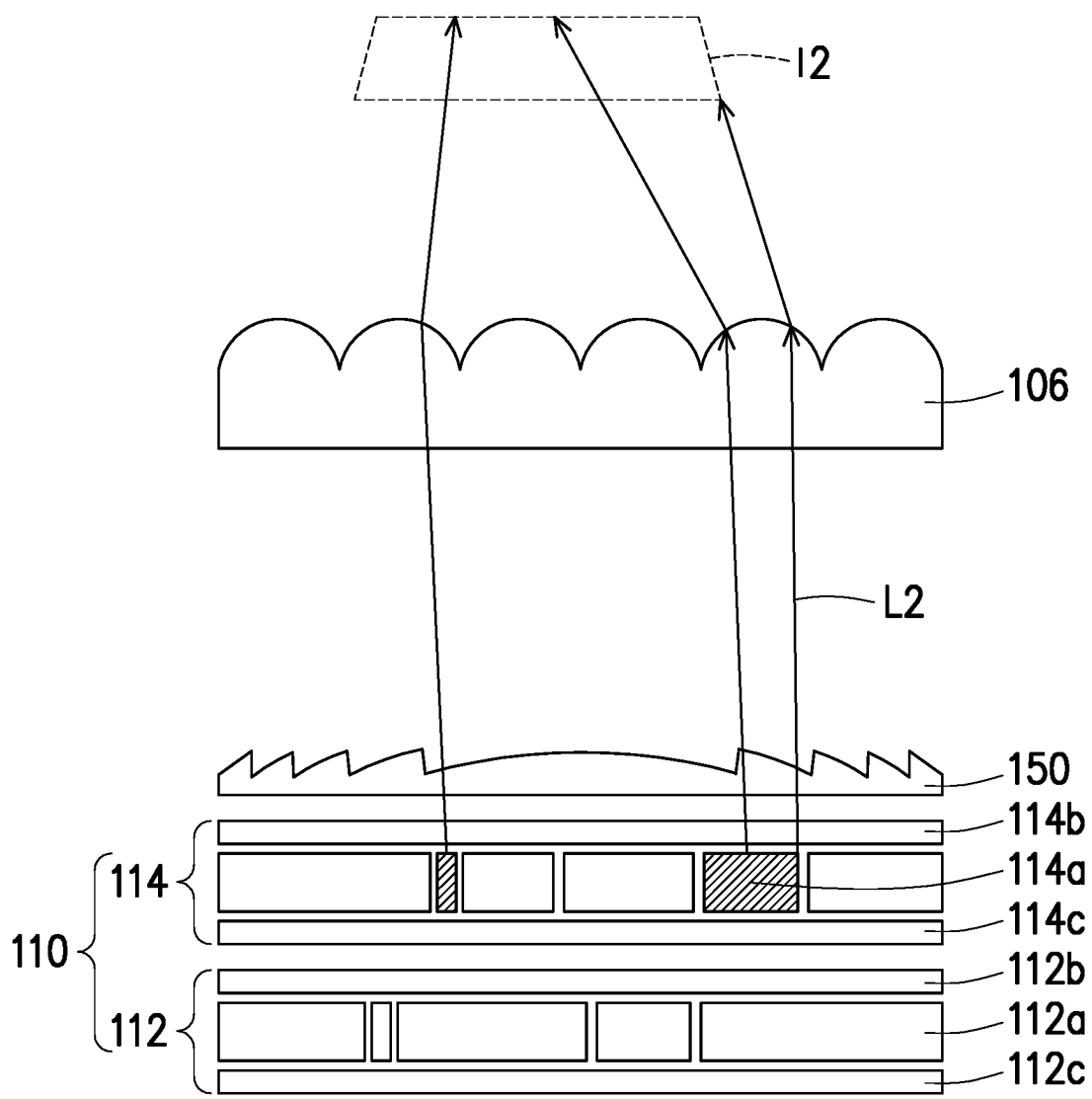

FIG. 5A and FIG. 5B are schematic diagrams of an optical imaging module 100D according to an embodiment of the disclosure. The light-emitting module 110 of the optical imaging module 100D includes a first light-emitting module 112 and a second light-emitting module 114, where the second light-emitting module 114 may be located between the first light-emitting module 112 and the collimating lens 150. In some embodiments, the first light-emitting module 112 may be located between the second light-emitting module 114 and the collimating lens 150, which is not limited by the disclosure. The second light-emitting module 114 is electrically connected to the signal processing module 300 (not shown). The structures of the first light-emitting module 112 and the second light-emitting module 114 may be similar to that of the light-emitting module 110, and include light-emitting layers 112a, 114a, first electrodes 112b, 114b, and second electrodes 112c, 114c. The component functions of the first light-emitting module 112 and the second light-emitting module 114 are similar to that of the light-emitting module 110, which are not repeated. The second electrode 114c of the second light-emitting module 114 faces the first electrode 112b of the first light-emitting module 112 and is also a light-emitting surface of the first light-emitting module 112. The second electrode 114c of the second light-emitting module 114 may be a transparent electrode to reduce the loss of light L1 emitted by the first light-emitting module 112 when passing through the second light-emitting module 114. According to some embodiments, the light-emitting layers 112a and 114a may be single-color or multi-color layered light-emitting monomers. The conduction positions of the first electrodes 112b, 114b and the second electrodes 112c, 114c may be designed to respectively control the lighting states of the light-emitting layers 112a, 114a to generate the imaging light L1, L2 of the floating images I1, I2 to be imaged. According to some other embodiments, the light-emitting layers 112a, 114a may be single-color or multi-color layered light-emitting monomers with different sizes of light-emitting regions, and the first electrodes 112b, 114b and the second electrodes 112c, 114c may be designed to respectively control lighting states of the different sizes of light-emitting regions of the light-emitting layers 112a, 114a to generate the imaging lights L1, L2 of the floating images I1, I2 to be imaged.

Referring to FIG. 5A and FIG. 5B, after the first light L1 emitted by the first light-emitting module 112 passes through the second light-emitting module 114, it passes through the collimating lens 150 and the optical modulator 106. The optical modulator 106 focuses the first light L1 on a specific position to generate a first floating image I1. The second light L2 emitted by the second light-emitting module 114 passes through the collimating lens 150 and the optical modulator 106. The optical modulator 106 focuses the second light L2 on a specific position to generate a second floating image I2. The light L2 emitted by the light-emitting layer 114a of the second light-emitting module 114 may be different from the light L1 emitted by the light-emitting layer 112a of the first light-emitting module 112, so that the second floating image I2 generated by the second light-emitting module 114 may be different from the first floating image I1 generated by the first light-emitting module 112. The second floating image I2 generated by the second light-emitting module 114 may have a different shape, color, image, or brightness from the first floating image I1 generated by the first light-emitting module 112.

By controlling the individual light-emitting layers, i.e., the light-emitting layer 112a of the first light-emitting module 112 and the light-emitting layer 114a of the second light-emitting module 114, the optical imaging module 100D may generate different light L1, L2, and accordingly generate different floating images I1 and I2.

As shown in FIG. 5A and FIG. 5B, the number of the light-emitting modules of the optical imaging module 100D is two. In some embodiments, according to design requirements, the number of the light-emitting modules of the optical imaging module 100D may be greater than two, and corresponding floating images are generated accordingly.

Figure 6:
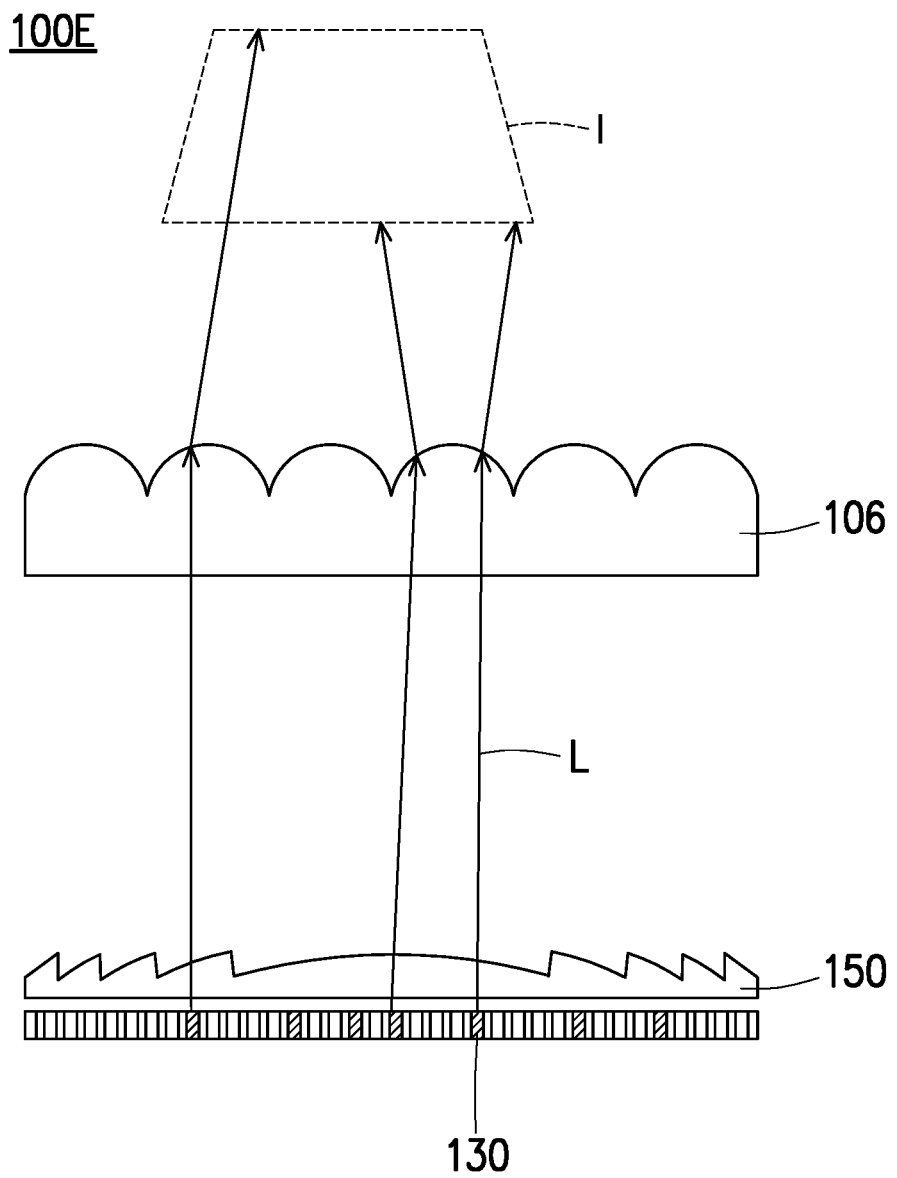
FIG. 6 is a schematic diagram of an optical imaging module according to an embodiment of the disclosure.

FIG. 6 is a schematic diagram of an optical imaging module 100E according to an embodiment of the disclosure. The optical imaging module 100E includes a display module 130, the collimating lens 150 and the optical modulator 106. After the light L is generated by the display module 130, it passes through the collimating lens 150 and the optical modulator 106 to form a floating image I.

In the optical imaging module 100E, the display module 130 is used to replace the light-emitting modules 110 and 120. The display module 130 includes a plurality of pixels that may be individually driven, and by controlling lighting states of the individual pixels, a color, brightness, direction and other characteristics of the generated light L may be changed to generate a variable floating image I.

According to some embodiments, the pixels of the display module 130 of the optical imaging module 100E may be composed of liquid crystals, light-emitting diodes, quantum dots, organic light-emitting diodes, or other similar display elements, but the disclosure is not limited thereto.

As shown in FIG. 6, the light L emitted by the display module 130 passes through the collimating lens 150, and then passes through the optical modulator 106 to focus on a specific position to generate the floating image I. The display module 130 has functions similar to functions of a light source and a light filter, and may actively generate imaging light. In addition, the display module 130 may individually drive the pixels to change a pattern of the display module 130.

Figure 7:
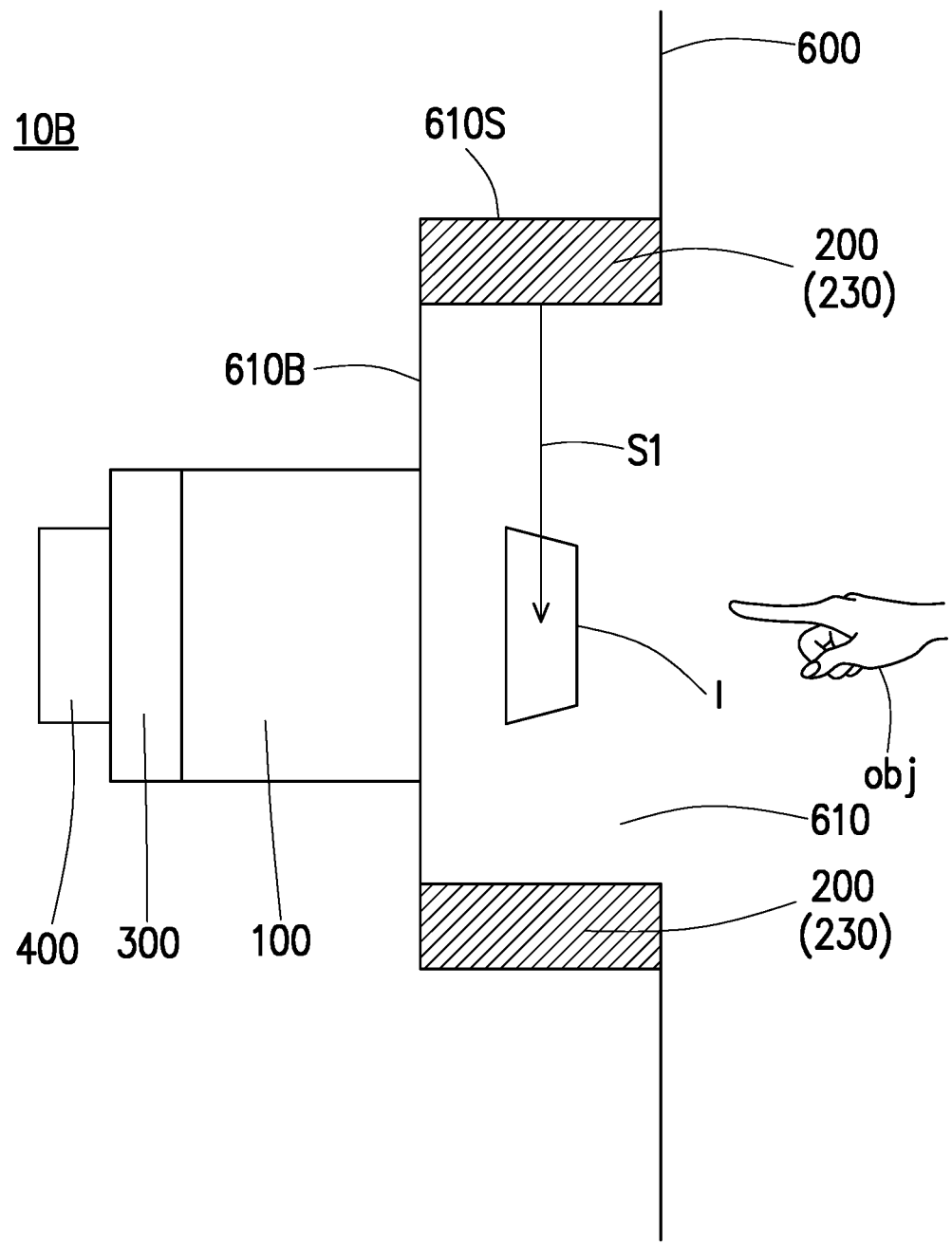
FIG. 7 is a schematic diagram of a floating image device according to an embodiment of the disclosure.

FIG. 7 is a schematic diagram of a floating image device 10B according to an embodiment of the disclosure. The floating image device 10B is located in a space 610 of an object 600. According to some embodiments, the object 600 may be a panel, a wall, or other entities on which the floating image device is to be installed. The floating image device 10B includes an optical imaging module 100, a sensing module 200, a signal processing module 300, and a power supply module 400. The optical imaging module 100, the signal processing module 300, and the power supply module 400 may be located on a surface 610B of the space 610 of the object 600, and the floating image I generated by the optical imaging module 100 is entirely formed in the space 610 of the object 600. According to some embodiments, the floating image I generated by the optical imaging module 100 may partially or completely float outside the space 610 of the object 600 (not shown). According to some embodiments, the optical imaging module 100 may be one of the aforementioned optical imaging modules 100A, 100B, 100C, 100D, or 100E.

The sensing module 200 includes a sensing module 230 disposed on a side surface 610S of the space 610. As shown in FIG. 7, the sensing module 230 surrounds the floating image I. A sensing method of the sensing module 230 is similar to that of the sensing module 210 in FIG. 1 and FIG. 2A to FIG. 2F. The sensing module 230 may send a detection signal S1 to sense position information of a tested object entering a contour range of the floating image I. According to some embodiments, the detection signal sent by the sensing module 230 is an ultrasonic signal, an infrared signal, or other signals that do not interfere with the light L, but the disclosure is not limited thereto.

By using the method shown in FIG. 2A to FIG. 2F, the sensing module 230 may sequentially detect the position information of the tested object obj at different sensing times, so that the optical imaging module 100 and the signal processing module 300 of the floating image device 10B may generate the corresponding floating image I. In this way, the floating image device 10B may be integrated with a physical space and configured according to actual environmental requirements, which allows the user to have an operating experience closer to interacting with a real object.

Figure 8:
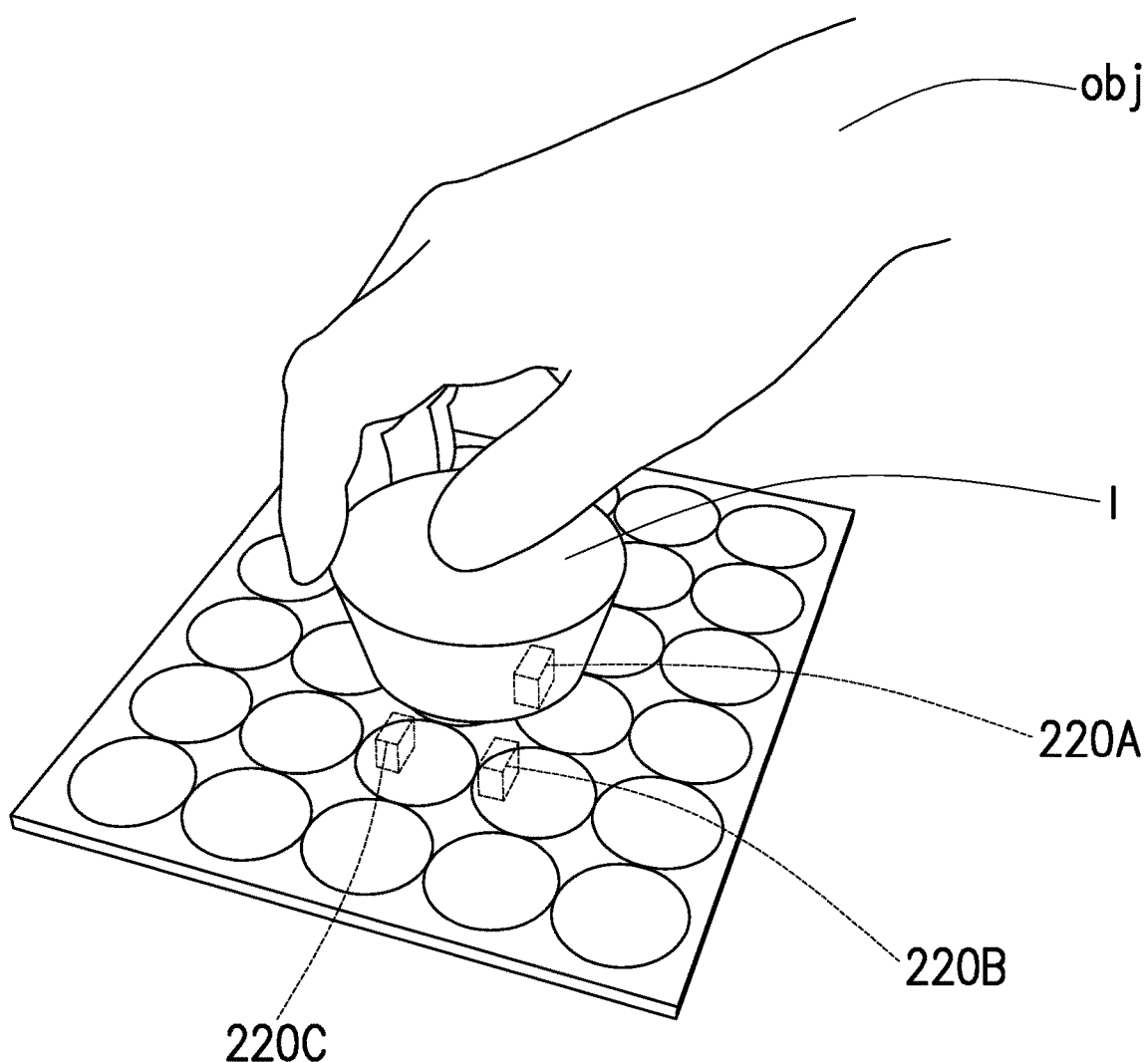
FIG. 8 is a schematic diagram of a floating image device according to an embodiment of the disclosure.

FIG. 8 is a schematic diagram of a floating image device 10C according to an embodiment of the disclosure. As shown in FIG. 8, the floating image device 10C generates a floating image I and is equipped with a plurality of sensing elements 220A, 220B, and 220C. The number of the sensing elements may be determined according to actual requirements, which is not limited by the disclosure. As shown in FIG. 8, the plurality of sensing elements may be a plurality of embedded sensing elements 220A, 220B, and 220C. In some embodiments, the plurality of sensing elements may also be a plurality of external sensing elements. The plurality of sensing elements 220A, 220B, and 220C may be linked spatially related to an optical imaging module and a signal processing module that are not shown in the floating image device 10C. By using the method shown in FIG. 2A to FIG. 2F, the plurality of sensing elements 220A, 220B, and 220C may sequentially detect the position information of the tested object obj at different sensing times, and calculate and determine an interaction mode between the tested object obj and the floating image I. According to the interaction mode between the tested object obj and the floating image I, the optical imaging module and the signal processing module of the floating image device 10C may generate the corresponding floating image. According to some embodiments, the interaction mode between the tested object obj and the floating image I may include different motions such as turning, pressing, pushing, pulling, toggling, etc., and the floating image device 10C may correspondingly generate different floating images including a knob, a button, a push rod, a pull rod, a switch, etc. By generating a variety of different floating images, a user may have an operating experience closer to interacting with real objects.

Figure 9:
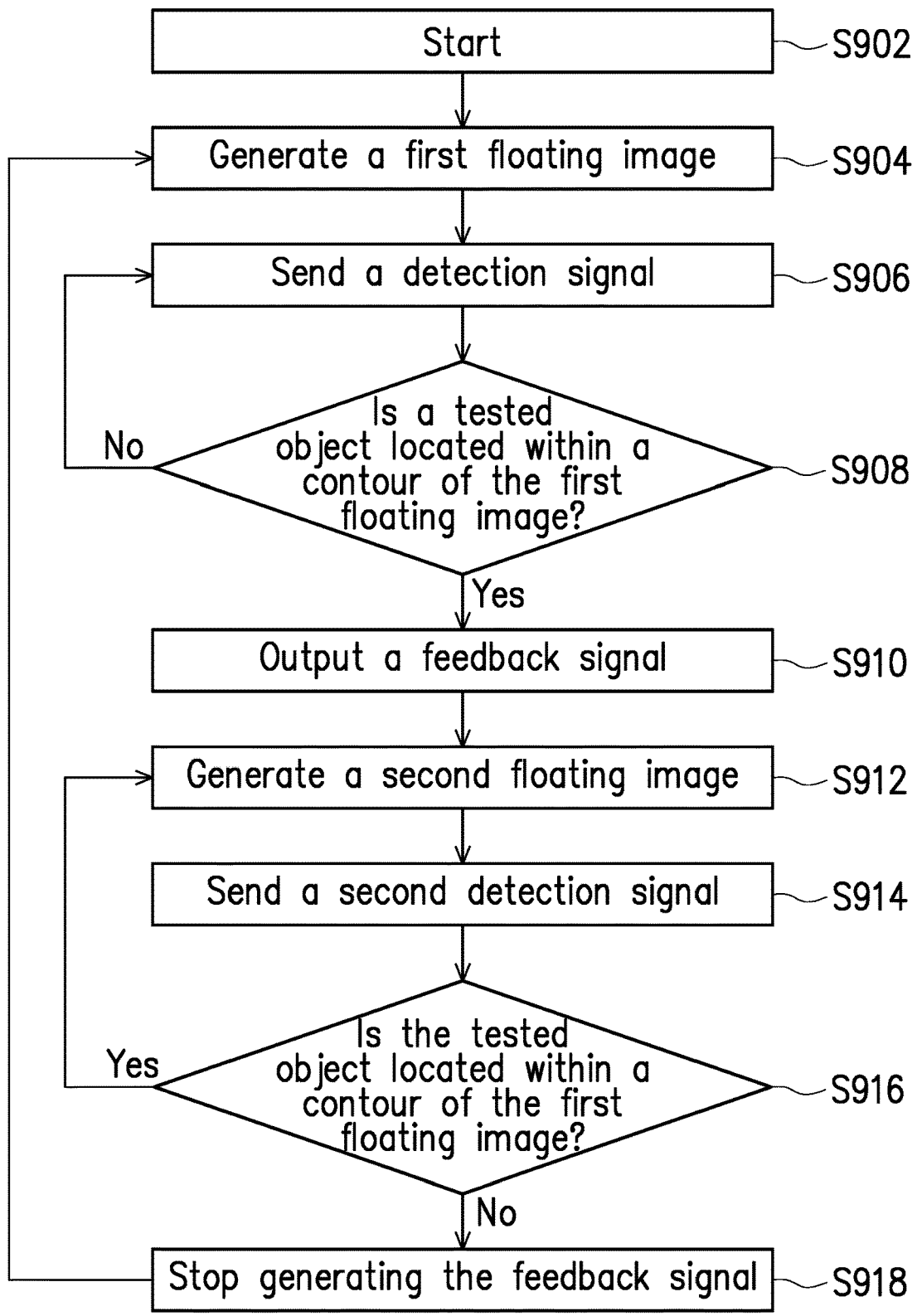
FIG. 9 is a flowchart of a method for generating floating images according to an embodiment of the disclosure.

FIG. 9 is a flowchart of a method for generating floating images according to an embodiment of the disclosure.

Referring to FIG. 2A, in step S902, the floating image device 10A is activated.

Referring to FIG. 2A, in step S904, the optical imaging module 100A generates a first floating image I1.

Referring to FIG. 2A, in step S906, the transmitter 212 of the sensing module 210 sends the detection signal S1.

Referring to FIG. 2A and FIG. 2B, in step S908, the floating image device 10A inspects whether the tested object obj is located within the contour C of the first floating image I1. As shown in FIG. 2A, the tested object obj is not located within the contour C of the first floating image I1, and the receiver 214 of the sensing module 210 does not receive the detection signal S1 reflected by the tested object obj. As shown in FIG. 2B, the tested object obj is located within the contour C of the first floating image I1, and the receiver 214 of the sensing module 210 receives the detection signal S1 reflected by the tested object obj.

Referring to FIG. 2A and FIG. 2B, in step S908, the floating image device 10A inspects whether the tested object obj is located within the contour C of the first floating image I1 by detecting whether the receiver 214 of the sensing module 210 receives the detection signal S1 reflected by the tested object obj. If the tested object obj is located within the contour C of the first floating image I1, step S910 is executed. If the tested object obj is not located within the contour C of the first floating image I1, it may optionally wait for a predetermined time before returning to step S906.

Referring to FIG. 2B, in step S910, the sensing module 210 generates the feedback signal $S_{FB}$, and transmits the feedback signal $S_{FB}$ to the signal processing module 300.

Referring to FIG. 2C and FIG. 2D, in step S912, after receiving the feedback signal $S_{FB}$ sent by the sensing module 210, the signal processing module 300 controls the optical imaging module 100A to generate the second floating image I2 or the second floating image I2' different from the first floating image I1.

Referring to FIG. 2E, in step S914, the transmitter 212 of the sensing module 210 sends the second detection signal S2.

Referring to FIG. 2E, in step S916, it is inspected whether the tested object obj is located within the contour C of the first floating image I1 by detecting whether the receiver 214 of the sensing module 210 receives the second detection signal S2 reflected by the tested object obj. If the tested object obj is detected, the method flow returns to step S912. If the tested object obj is not detected, step S918 is executed.

Referring to FIG. 2F, in step S918, the tested object obj is not located within the contour C of the first floating image I1, the transmitter 212 of the sensing module 210 stops sending the feedback signal to the signal processing module 300, and the optical imaging module 100A resumes generating the first floating image I1.

In summary, according to the device and the method for generating floating images of the embodiments of the disclosure, interactive floating images with a real spatial stereoscopic sense may be generated. In addition, the floating image device of the embodiment of the disclosure may effectively reduce a module size, may be customized according to a usage environment, and may be more effectively integrated with a usage site.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A device for generating floating images, comprising:
    an optical imaging module, configured to generate a first light and a first floating image from the first light;
    a sensing module, sending a detection signal to sense first position information of a tested object at a first time point, and generating a feedback signal according to the first position information when the first position information is within a contour range of the first floating image; and
    a signal processing module, electrically connected to the optical imaging module and the sensing module to receive the feedback signal, and generating at least one control command and/or at least one feedback command corresponding to the feedback signal, wherein the at least one control command is transmitted to a controller to perform corresponding control on the controller, and the at least one feedback command is transmitted to the optical imaging module, so that the optical imaging module generates a second light and a second floating image from the second light, wherein the second floating image is different from the first floating image,
    wherein the optical imaging module comprises:
    a light source, electrically connected to the signal processing module, and generating a light;
    a light filter receiving the light, and performing patterning and optical field pattern optimization on the light to generate the first light or the second light,
    wherein the light filter is an integrated imaging film recording direction and angle information of light forming the floating image.

2. The device as claimed in claim 1, wherein the optical imaging module comprises:
    an optical modulator, receiving the first light or the second light, focusing the first light or the second light, and generating the first floating image by using the first light, or generating the second floating image by using the second light.

3. The device as claimed in claim 2, wherein the optical modulator is a microlens array, an optical fiber, an optical grating, or a photonic crystal.

4. The device as claimed in claim 1, wherein the optical imaging module comprises:
    a first light-emitting module, electrically connected to the signal processing module, and generating the first light, wherein the first light-emitting module comprises:
    a light-emitting layer;
    a first electrode, located on a light-emitting surface of the light-emitting layer; and
    a second electrode, located on another side of the light-emitting layer opposite to the light-emitting surface, wherein the first electrode and the second electrode control a lighting state of the light-emitting layer, and one of the first electrode and the second electrode of the first light-emitting module is the light filter for generating the first light; and
    an optical modulator, receiving the first light, and focusing the first light to generate the first floating image.

5. The device as claimed in claim 4, wherein the optical imaging module further comprises:
    a second light-emitting module, electrically connected to the signal processing module and located between the first light-emitting module and the optical modulator to generate the second light, wherein the second light-emitting module comprises:
    a light-emitting layer;
    a first electrode, located on a light-emitting surface of the light-emitting layer; and
    a second electrode, located on another side of the light-emitting layer opposite to the light-emitting surface, wherein the first electrode and the second electrode control a lighting state of the light-emitting layer, and one of the first electrode and the second electrode of the second light-emitting module is the light filter for generating the second light,
    wherein the optical modulator receives the second light and focuses the second light to generate the second floating image.

6. The device as claimed in claim 1, wherein the optical imaging module comprises:
    a display module, electrically connected to the signal processing module, and comprising a plurality of pixels capable of being individually driven, and generating at least one light by controlling a lighting state of individual pixels of the plurality of pixels; and an optical modulator, receiving the at least one light, and focusing the at least one light to generate the floating image corresponding to the at least one light.

7. The device as claimed in claim 1, wherein the sensing module is located on an inner side of a hollow frustum of a housing of the device and faces a surface of the optical imaging module, and the hollow frustum covers above a part of a light-emitting surface of the optical imaging module and surrounds the floating image.

8. The device as claimed in claim 1, wherein the sensing module is located on an outer side of a hollow frustum of a housing of the device, the hollow frustum has an opening, and the sensing module covers the opening.

9. The device as claimed in claim 1, wherein the sensing module is arranged on a light incident surface of the light filter.

10. The device as claimed in claim 1, wherein the optical imaging module is located in a physical object which the device is installed, and the sensing module is arranged on a side surface of the space and a periphery of the floating image.

11. The device as claimed in claim 1, wherein the second floating image has a different shape, color, image, or brightness from that of the first floating image.

12. A method for generating floating images, comprising:
generating a first light and generating a first floating image from the first light by an optical imaging module;
sending a detection signal to sense first position information of a tested object at a first time point, and generating a feedback signal according to the first position information when the first position information is within a contour range of the first floating image by a sensing module; and
receiving the feedback signal, and generating at least one control command and/or at least one feedback command corresponding to the feedback signal by a signal processing module, wherein corresponding control is performed according to the at least one control command, and a second light is generated and a second floating image is generated from the second light according to the at least one feedback command by the optical imaging module, wherein the second floating image is different from the first floating image,
wherein the optical imaging module comprises:
a light source, electrically connected to the signal processing module, and generating a light;
a light filter receiving the light, and performing patterning and optical field pattern optimization on the light to the first light or the second light,
wherein the light filter is an integrated imaging film recording direction and angle information of light forming the floating image.

13. The method as claimed in claim 12, further comprising:
sending a second detection signal to sense second position information of the tested object at a second time point after the first time point, and when the second position information is located outside the contour range of the first floating image, stopping generating the feedback signal and stopping generating the at least one control command and/or the at least one feedback command corresponding to the feedback signal according to the second position information, stopping performing the corresponding control according to the at least one control command, stopping generating the second floating image different from the first floating image according to the at least one feedback command, and resuming generating the first floating image.

14. The method as claimed in claim 12, wherein the second floating image has a different shape, color, image, or brightness from that of the first floating image.

15. The method as claimed in claim 12, wherein the detection signal is an invisible light signal or an ultrasonic signal.

* * * * *